United States Patent
Mazenauer (10) Patent No.: US 10,384,226 B2
(45) Date of Patent: Aug. 20, 2019

(54) SPRAY GUN FILTER FOR FILTERING LIQUID

(75) Inventor: Rolf Mazenauer, Widnau (CH)

(73) Assignee: J. Wagner AG, Alstatten (CH)

(*) Notice: Subject to any disclaimer, the term of this patent is extended or adjusted under 35 U.S.C. 154(b) by 0 days.

(21) Appl. No.: 13/822,042

(22) PCT Filed: Sep. 2, 2011

(86) PCT No.: PCT/CH2011/000202
§ 371 (c)(1),
(2), (4) Date: Apr. 24, 2013

(87) PCT Pub. No.: WO2012/034240
PCT Pub. Date: Mar. 22, 2012

(65) Prior Publication Data
US 2013/0206873 A1    Aug. 15, 2013

(30) Foreign Application Priority Data
Sep. 14, 2010   (EP) .................................. 10405171

(51) Int. Cl.
*B05B 15/40*     (2018.01)
*B01D 29/05*     (2006.01)
*B05B 9/04*      (2006.01)

(52) U.S. Cl.
CPC ............. *B05B 15/40* (2018.02); *B01D 29/05* (2013.01); *B05B 9/0403* (2013.01); *B01D 2201/04* (2013.01); *B01D 2201/0407* (2013.01); *B01D 2201/0415* (2013.01)

(58) Field of Classification Search
CPC .......... B05B 5/025–1691; B05B 7/129; B05B 7/2478; B05B 9/0894; B05B 11/00–3098; B05B 15/40; B01D 2201/02; B01D 29/23; B01D 2201/0415; B01D 2275/201; B01D 46/0024; B01D 29/58; B01D 46/0005; B01D 46/2403; B01D 29/0027; B01D 29/0097; B01D 29/014; B01D 29/05; B01D 29/07; B01D 29/071; B01D 2201/04; B01D 2201/0407; B01D 2201/0423; B01D 2201/307; Y10S 264/48; B29L 2031/14; F02M 35/02483
USPC ......... 239/590; 210/483, 484, 497.01, 497.3, 210/448, 451
See application file for complete search history.

(56) References Cited
U.S. PATENT DOCUMENTS

| | | |
|---|---|---|
| 3,065,918 A | 11/1962 | Hostetter |
| 4,505,816 A * | 3/1985 | Wozniak et al. ............. 210/439 |
| 4,818,398 A | 4/1989 | Lott |
| 5,514,275 A | 5/1996 | Morgan, Jr. |
| 5,916,435 A * | 6/1999 | Spearman et al. ............. 210/132 |
| 6,488,846 B1 * | 12/2002 | Marangi ....................... 210/232 |

(Continued)

OTHER PUBLICATIONS

International Search Report for corresponding International Application No. PCT/CH2011/000202 dated Oct. 31, 2011.

*Primary Examiner* — Jason J Boeckmann
*Assistant Examiner* — Juan C Barrera
(74) *Attorney, Agent, or Firm* — Renner, Otto, Boisselle & Sklar, LLP (57) ABSTRACT

The spray gun filter according to the invention for filtering liquid comprises a filter fabric and a filter support, which has outlet openings for the liquid and which surrounds the filter fabric from the outside.

16 Claims, 8 Drawing Sheets

(56) References Cited

U.S. PATENT DOCUMENTS 7,832,567 B2 * 11/2010 Joseph ................ B01D 29/15
 210/464
2005/0103700 A1   5/2005 Shirakawa

* cited by examiner

SPRAY GUN FILTER FOR FILTERING LIQUID

TECHNICAL FIELD

The invention relates to a spray gun filter, which is arranged on, or in the vicinity of, the spray gun and is suitable for filtering liquid, such as coating material.

PRIOR ART

Figure 1:
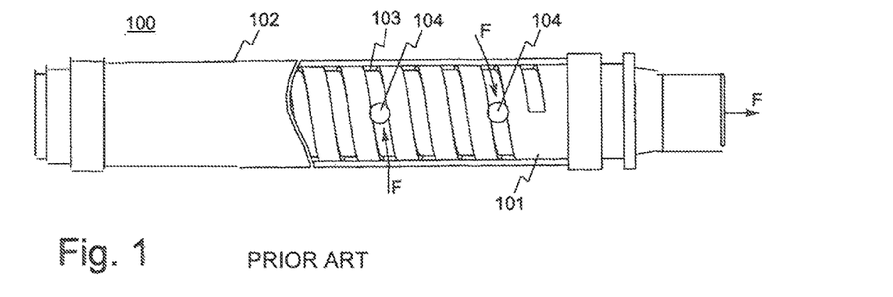
FIG. 1 shows a side view of a spray gun filter that is already known, wherein one part is illustrated in a cut-away manner.
Figure 2:
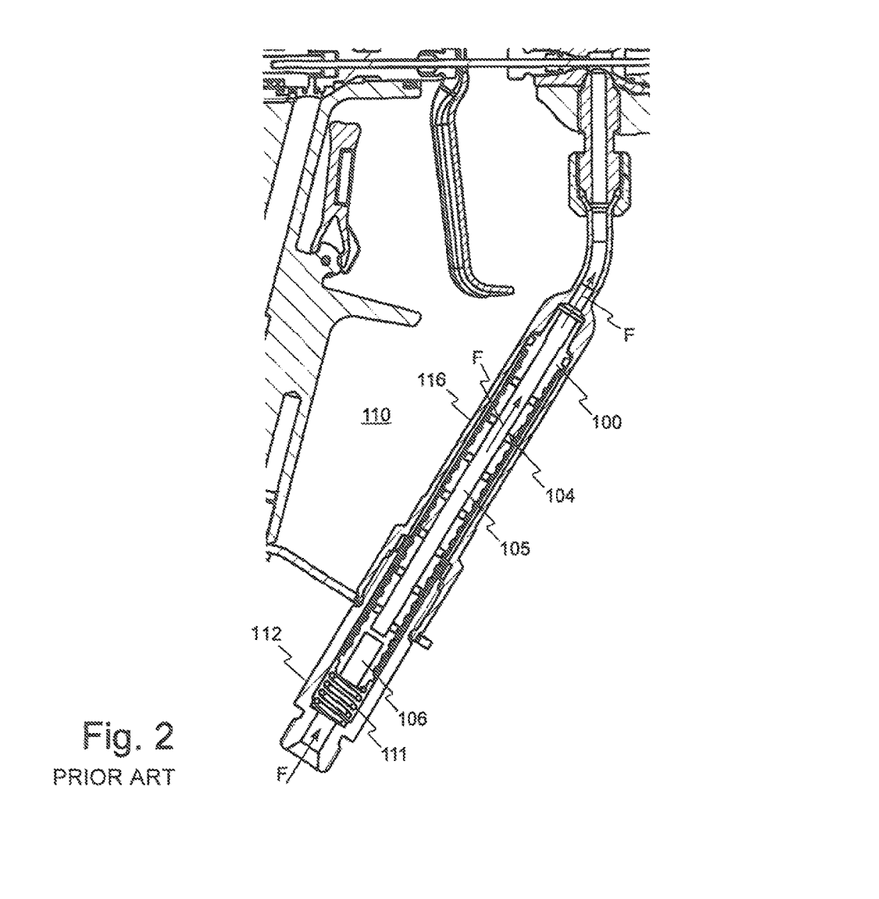
FIG. 2 shows a sectional side view of part of a spray gun with the known spray gun filter.

Previously, the spray gun filter 100 shown in FIGS. 1 and 2 was used in spray guns 110. The spray gun filter 100 comprises a tubular filter support 101 and a tubular filter fabric 102, which surrounds the outer lateral surface of the filter support. Coating material F is pressed externally through the filter fabric 102 under pressure, generally between 80 and 500 bar, and then flows along a channel 103, which is located between the filter fabric 102 and the filter support 101. In the filter support 101, outlet openings 104 are provided, which connect the channel 103 to the interior 105 of the filter support 101. The coating material F thus flows through the channel 103 and the outlet openings 104 into the interior 105 of the filter support 101. From here, the filtered coat-ing material F reaches the spray nozzle of the spray gun 110. The filter residues are caught externally on the filter fabric 102. The spray gun filter 100 has the disadvantage that the filter residues remain in the filter housing 112, 116 of the spray gun 112 when the spray gun filter 100 is removed. In addition, the spray gun filter 100 has the disadvantage that a spring 111 is necessary in order to fix the spray gun filter 100 in the correct position in the filter housing 112, 116. A further disadvantage of the spray gun filter 100 is that it has a dead space 106 at the upstream end, said dead space increasing the overall length of the spray gun filter 100 and therefore also of the filter housing 112, 116.

DISCLOSURE OF THE INVENTION

An object of the invention is to specify a spray gun filter for filtering liquid, said spray gun filter having a longer service life and at the same time smaller dimensions.

Advantageously, there is no need for an additional component, such as the spring in the embodiment according to FIG. 2, in order to fix the spray gun filter in the filter housing. The production costs can thus be reduced. Since the additional component is omitted, it can also no longer become lost and also does not have to be cleaned. The maintenance effort for the personnel is reduced and the risk of the spring and the spray gun filter being inserted incorrectly into the filter housing is likewise reduced.

A further advantage of the spray gun filter according to the invention lies in the fact that no filter residues and impurities remain in the filter housing of the spray gun once the spray gun filter has been removed from the filter housing. In addition, the spray gun filter according to the invention generates a lower pressure loss.

The handling of the entire spray gun, and in particular the disassembly, is also improved. If coating material has solidified in the filter housing, the spray gun filter according to FIG. 1 can only be removed from the filter housing by applying force. It is often even necessary to use a tool for this purpose. In order to remove the spray gun filter according to the invention from the filter housing, much less force is necessary. There is generally no need to use a tool for this purpose.

The spray gun filter according to the invention no longer has any dead space compared to the spray gun filter according to FIG. 1. The total length of the spray gun filter and also the length of the filter housing are thus reduced. The total weight of the spray gun is reduced by the weight saving with the spray gun filter, by the weight saving with the filter housing and by the weight saving with the coating material.

The object is achieved by a spray gun filter for filtering liquid having the features specified in claim 1.

The spray gun filter according to the invention for filtering liquid comprises a filter fabric and a filter support, which has outlet openings for the liquid and which surrounds the filter fabric from the outside.

Advantageous developments of the invention will emerge from the features specified in the dependent claims.

In one embodiment of the spray gun filter according to the invention, the outlet openings are distributed over the length of the filter support. This has the advantage that the pressure bearing on the filter support is distributed uniformly. The filter support can thus be produced with thinner walls and using less material.

In a further embodiment of the spray gun filter according to the invention, the filter support is externally conical. It can thus be removed more easily from the spray gun. This is advantageous in particular if coating material has hardened in the filter housing of the spray gun and the spray gun filter has become stuck to the filter housing.

In an additional embodiment of the spray gun filter according to the invention, the filter support is open at one end and is closed at the other end.

In a development of the spray gun filter according to the invention, the filter fabric is produced from wire or a sintered, liquid-permeable material. The filter fabric made of wire is robust and has a long service life.

In another development of the spray gun filter according to the invention, the filter fabric is substantially cylindrical. A filter fabric shaped in this way can be produced easily. Filter fabric from a roll can be used as starting material, which is cut to size, rolled to the desired diameter and welded at the seam. In addition, the cylindrically shaped filter fabric can be easily fitted into the filter support and connected thereto.

In accordance with a further feature of the invention, said invention can be improved yet further by producing the filter support from polyamide, polypropylene, polyethylene or polyoxymethylene. These materials can be injection moulded, and therefore the filter support can be produced cost effectively in high numbers. In addition, the spray gun filter with a filter support produced from one of these materials is stable enough to withstand pressures between 80 and 500 bar.

Furthermore, the spray gun filter according to the invention may have a sleeve, in which the filter support is arranged and with which the filter support and the sleeve are formed in such a way that they form a channel for the filtered liquid. As a result of the sleeve, the filtered liquid is prevented from coming into contact with the filter housing of the spray gun. If the liquid hardens in the spray gun filter, the spray gun filter does not stick to the filter housing, and it is therefore ensured even in this case that the spray gun filter can be easily removed from the filter housing.

A spray gun with which a filter housing is provided and with which the outer face of the filter support bears against the filter housing is also proposed. The spray gun has the above-mentioned advantages.

In an embodiment of the spray gun according to the invention, the filter support and the filter housing are formed in such a way that they together form a channel for the liquid.

In a further embodiment of the spray gun according to the invention, the filter support and the filter housing are formed in such a way that they together form a plurality of channels, which are interconnected. The pressure loss caused by the spray gun filter is thus reduced yet further.

In a development of the spray gun according to the invention, the filter housing comprises a first and a second housing part, wherein the two housing parts are interconnected by means of a releasable connection. The connection may be a screw connection for example. The spray gun filter can thus be removed from the filter housing, can be checked, and can be cleaned or replaced where necessary.

In a further development of the spray gun according to the invention, the filter housing has a shoulder, on which the filter support is supported. The shoulder can be used as a stop in order to define the axial position of the spray gun filter. As soon as liquid is pressed under pressure into the spray gun filter, the filter support is pressed against the stop.

A spraying system that comprises a spray gun, a tube line and a spray gun filter is also proposed, wherein the spray gun filter is arranged between two tube portions of the tube line.

Lastly, the spray gun filter can be used for water-soluble paint, solvent-containing paint, multi-component paint, primer, anti-corrosion agents or oil.

BRIEF DESCRIPTION OF THE DRAWINGS

The invention will be explained in greater detail hereinafter with a plurality of exemplary embodiments on the basis of 12 figures.

EMBODIMENTS OF THE INVENTION

The spray gun filter according to the invention can be used in a wide range of spray guns. Hereinafter, a spray gun will be understood to mean a gun for atomising or spraying a liquid, such as water-soluble paint, solvent-containing paint, multi-component paint, primer, dispersion, oil or anti-corrosion agents. A paint gun is likewise a spray gun intended for painting surfaces and is formed accordingly for the paints to be sprayed.

The spray gun filter according to the invention is particularly suitable for filtering coating material, primer, anti-corrosion agents or oil. Hereinafter, water-soluble paints, solvent-containing paints, metallic paints, stains, dispersions and multi-component paints will also be referred to as coating material.

Large-mesh filter fabrics are used with dispersions and metallic paints. Fine-mesh filter fabrics are used with stains, clear varnishes and other low-viscosity spraying materials.

First Embodiment

Figure 3:
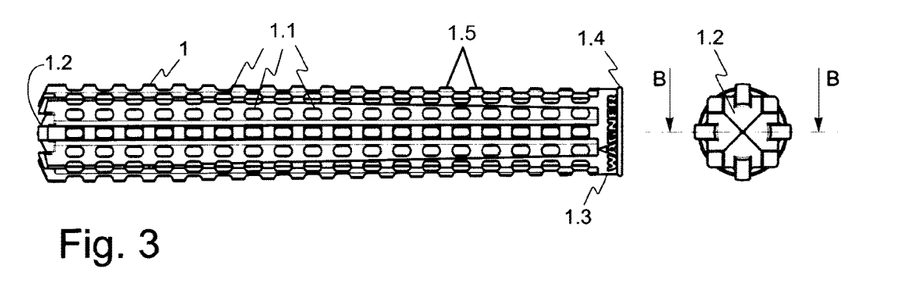
FIG. 3 shows a first possible embodiment of the spray gun filter according to the invention in a side view and as viewed from the filter head.

FIG. 3 shows a first possible embodiment of the spray gun filter according to the invention in a side view and in a front view, that is to say as viewed from the filter head 1.2. The first embodiment of the spray gun filter according to the invention is illustrated in longitudinal section in FIG. 4. Lastly, FIG. 5 shows the first embodiment of the spray gun filter according to the invention in an exploded view. The spray gun filter comprises a tubular filter support 1 and a cylindrical filter fabric 2 arranged within the filter support 1. The outer face 2.2 of the filter fabric 2 bears against the inner face of the filter support 1.

The filter support 1 comprises an inlet 1.3, through which liquid F to be filtered flows into the interior 24 of the spray gun filter. From here, the liquid F is pressed outwardly through the filter fabric 2, wherein particles, impurities and clumps are retained inside the spray gun filter. The retained material R is illustrated symbolically in FIG. 4. The filtered liquid F passes through a series of outlet openings 1.1, which are provided in the filter support 1, and flows out again from the spray gun filter. The filter support 1 further comprises a plurality of radial protruding supporting elements 1.5, which are provided to bear against the filter housing 12. The filtered liquid then flows between the filter support 1 and the filter housing 12, 16 (see FIG. 9), around the plurality of radial protruding supporting elements 1.5, in the direction of the filter head 1.2. From here, the filtered liquid passes through the channels provided in the filter head 1.2 into the material channel 16.2.

The outer surface of the filter support 1 may include a plurality of radial protruding supporting elements 1.5. These supporting elements 1.5 bear against the filter housing 12, 16 when the filter support 1 is inserted into the filter housing 12, 16.

The filter support 1 may have, externally, a cylindrical portion 8 and a conical portion 9. Here, the diameter D3 in the inlet region 1.3 is smaller than the diameter D2 at the filter head 1.2. Such a geometry has the advantage that the spray gun filter can be removed more easily from the filter housing 12, 16 (see FIG. 9). In particular if coating material hardens in the filter housing 12, 16 and the spray gun filter is thus stuck to the filter housing 12, 16, the application of force necessary in order to remove the spray gun filter from the filter housing 12, 16 can be considerably reduced by a such a geometry.

The filter fabric 2 has a substantially cylindrical shape. A filter fabric from a roll can be used as starting material, which is cut to size, rolled to the desired diameter and welded or glued at the seam 4. The filter fabric 2 is then inserted into the filter support 1 and connected thereto, for example by a glued or welded joint 3.

Figure 4:
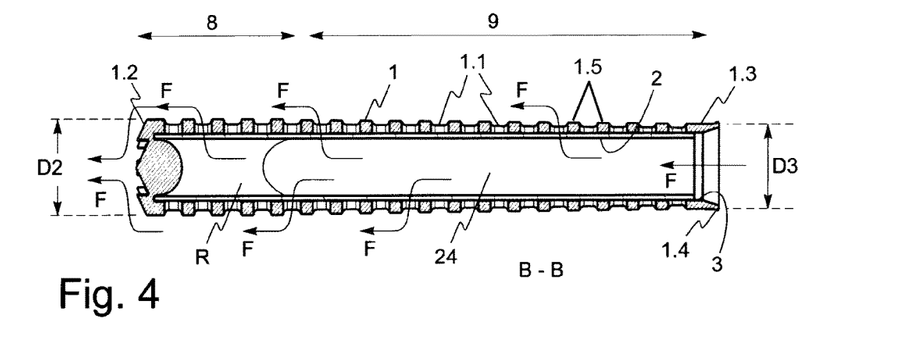
FIG. 4 shows a longitudinal sectional view of the first possible embodiment of the spray gun filter according to the invention.
Figure 5:
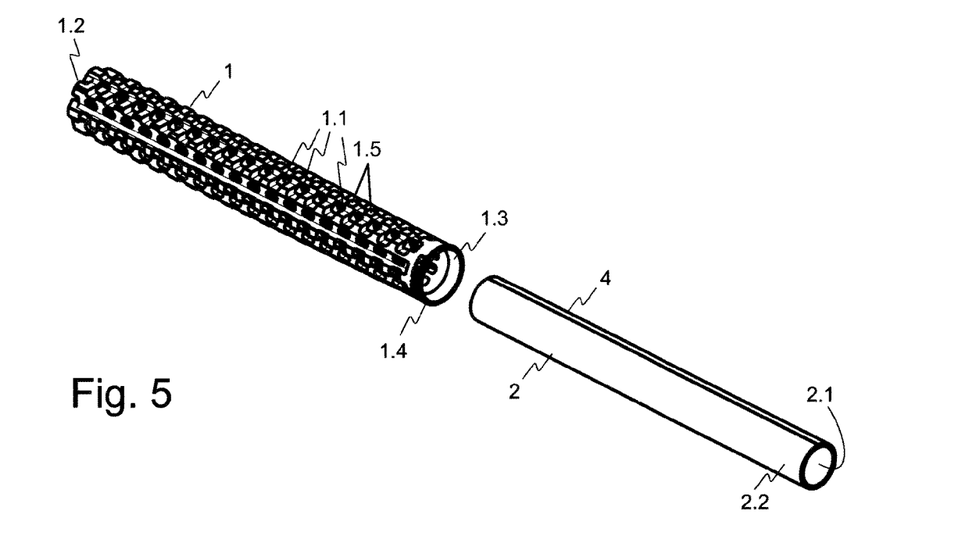
FIG. 5 shows an exploded view of the first possible embodiment of the spray gun filter according to the invention.

The seal 1.4 is formed as a lip seal in the embodiment according to FIGS. 3, 4 and 5. In the installed state, the lip seal 1.4 bears against the filter housing 12 and seals the inlet 1.3 of the spray gun filter with respect to the outlet openings 1.1 thereof. The greater the pressure inside the spray gun filter, the better is the sealing effect of the lip seal 1.4.

Second Embodiment

Figure 6A:
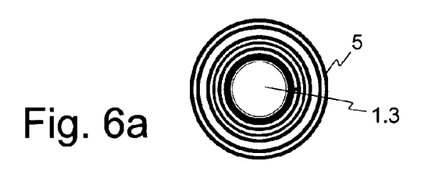
FIG. 6a shows a second possible embodiment of the spray gun filter according to the invention as viewed from the inlet side.
Figures 6B, 6C:
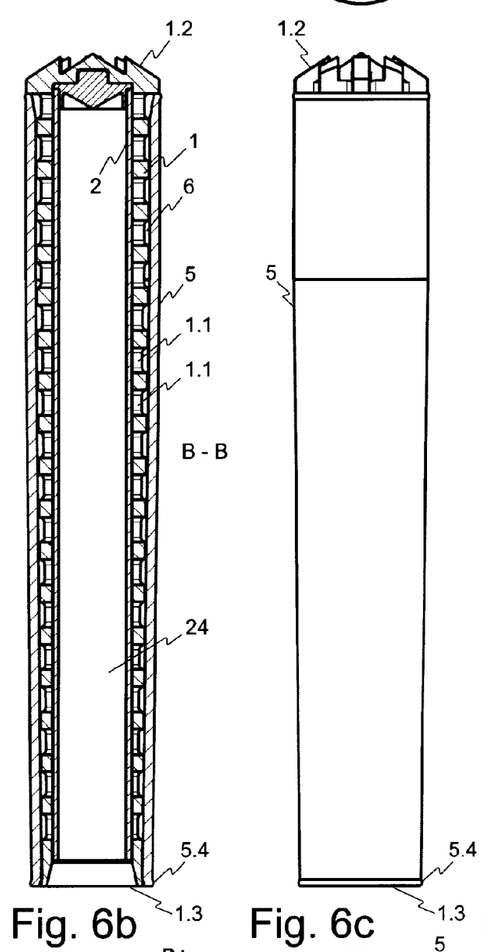
FIG. 6b shows the second embodiment of the spray gun filter according to the invention in longitudinal section taken along the line of section B-B.
FIG. 6c shows a side view of the second embodiment of the spray gun filter.
Figure 6D:
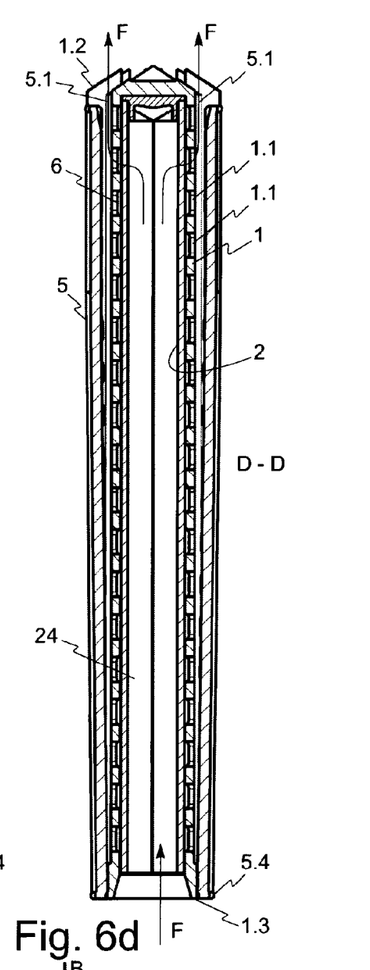
FIG. 6d shows the second embodiment of the spray gun filter in longitudinal section taken along the line of section D-D.
Figure 6E:
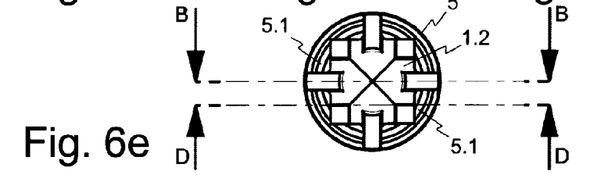
FIG. 6e shows the second embodiment of the spray gun filter according to the invention as viewed from the filter head.

A second possible embodiment of the spray gun filter according to the invention is illustrated in FIGS. 6a, 6b and 6c as viewed from the inlet side, in longitudinal section taken along the line of section B-B, and in a side view. FIGS. 6d and 6e show the second embodiment of the spray gun filter in longitudinal section taken along the line of section D-D and as viewed from the front.

The second embodiment basically differs from the first embodiment in that an additional sleeve 5 is provided, in which the filter support 1 is fitted together with the filter fabric. The outer face of the filter support 1 and the inner face of the sleeve 5 together form a channel 6 for the filtered liquid F. The outlet openings 5.1 in the spray gun filter are located at the filter head 1.2.

Since the filtered liquid F is guided through the channel 6 and only exits from the spray gun filter at the filter head 1.2 through the outlet openings 5.1, it does not come into contact with the filter housing 12, 16 of the spray gun 10. If the liquid F in the spray gun filter hardens, the spray gun filter does not stick to the filter housing 12, 16. The force applied to remove the spray gun filter can thus be reduced yet further compared to the first embodiment. A further advantage is that the user does not come into contact with the liquid F when removing the spray gun filter and his hands therefore remain clean.

Third Embodiment

Figure 7A:
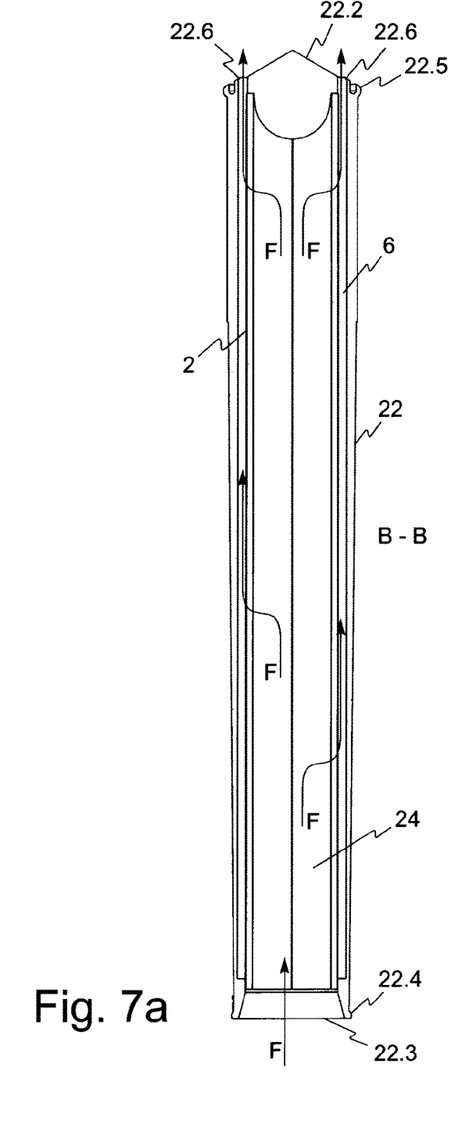
FIG. 7a shows a third possible embodiment of the spray gun filter according to the invention in longitudinal section taken along the line of section B-B.
Figure 7B:
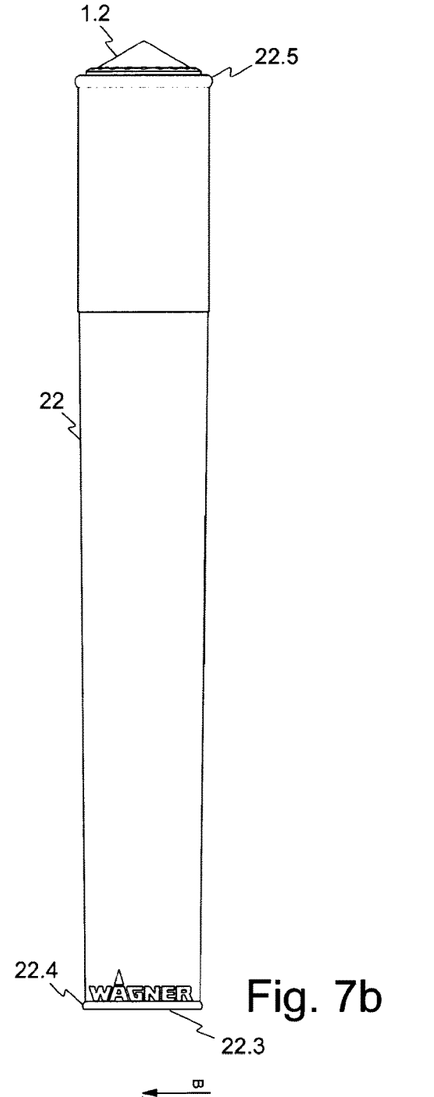
FIG. 7b shows a side view of the third embodiment of the spray gun filter.
Figure 7C:
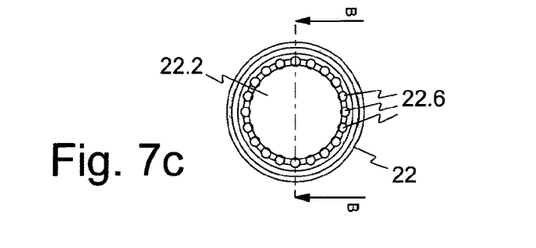
FIG. 7c shows the third embodiment of the spray gun filter as viewed from the filter head.

FIGS. 7a, 7b and 7c show a third possible embodiment of the spray gun filter according to the invention in longitudinal section taken along the line of section B-B in a side view and as viewed from the inlet side.

The third embodiment basically differs from the second embodiment in that a sleeve 22 is provided, in which the filter fabric 2 is fitted. The sleeve 22 is used as a filter support for the filter fabric 2 and, together therewith, forms a channel 6, through which the filtered liquid F is transported away. The outlet openings 22.6 are located at the filter head 22.2 in the third embodiment.

Similarly to the third embodiment, the filtered liquid F does not come into contact with the filter housing 12, 16 of the spray gun 10. If the liquid F hardens in the spray gun filter, the spray gun filter does not stick to the filter housing 12, 16. The force applied to remove the spray gun filter can thus be reduced yet further compared to the first embodiment.

Fourth Embodiment

Figure 8A:
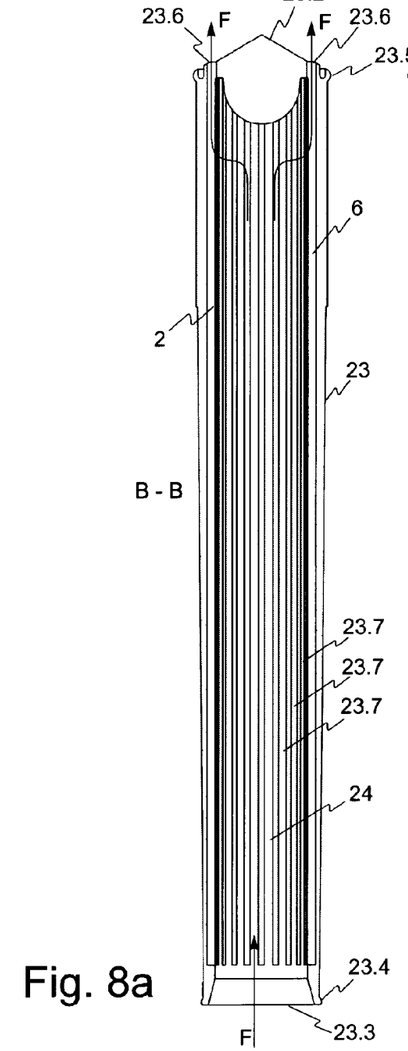
FIG. 8a shows a fourth possible embodiment of the spray gun filter according to the invention in longitudinal section taken along the line of section B-B.
Figure 8B:
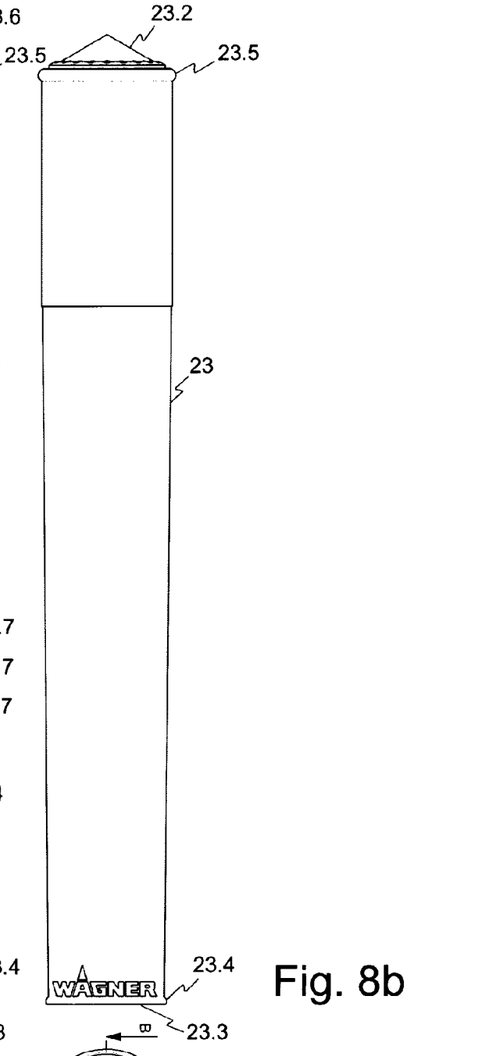
FIG. 8b shows a side view of the fourth embodiment of the spray gun filter.
Figure 8C:
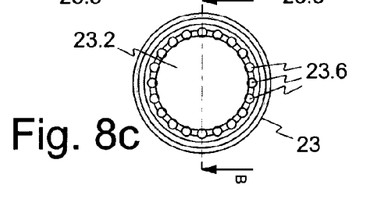
FIG. 8c shows the fourth embodiment of the spray gun filter as viewed from the filter head.

A fourth possible embodiment of the spray gun filter according to the invention is illustrated in FIGS. 8a, 8b and 8c in longitudinal section taken along the line of section B-B, in a side view, and as viewed from the inlet side.

The fourth embodiment basically differs from the third embodiment by the inner shape of the sleeve, which surrounds the filter fabric 1. On its inner face, the sleeve 23 has a series of grooves 23.7 running in the longitudinal direction, which, together with the filter fabric 2, form a series of channels 6, through which the filtered liquid F is transported to the outlet openings 23.6. The outlet openings 23.6 in the spray gun filter are located at the filter head 23.2, as in the third embodiment.

All embodiments of the spray gun filter according to the invention function in the same manner in principle. The liquid F to be filtered passes through an inlet opening 1.3, 22.3 or 23.3 into the interior 24 of the spray gun filter, where it is then pressed outwardly through the filter fabric 2, wherein the impurities are retained in the interior 24 of the spray gun filter.

Figure 9:
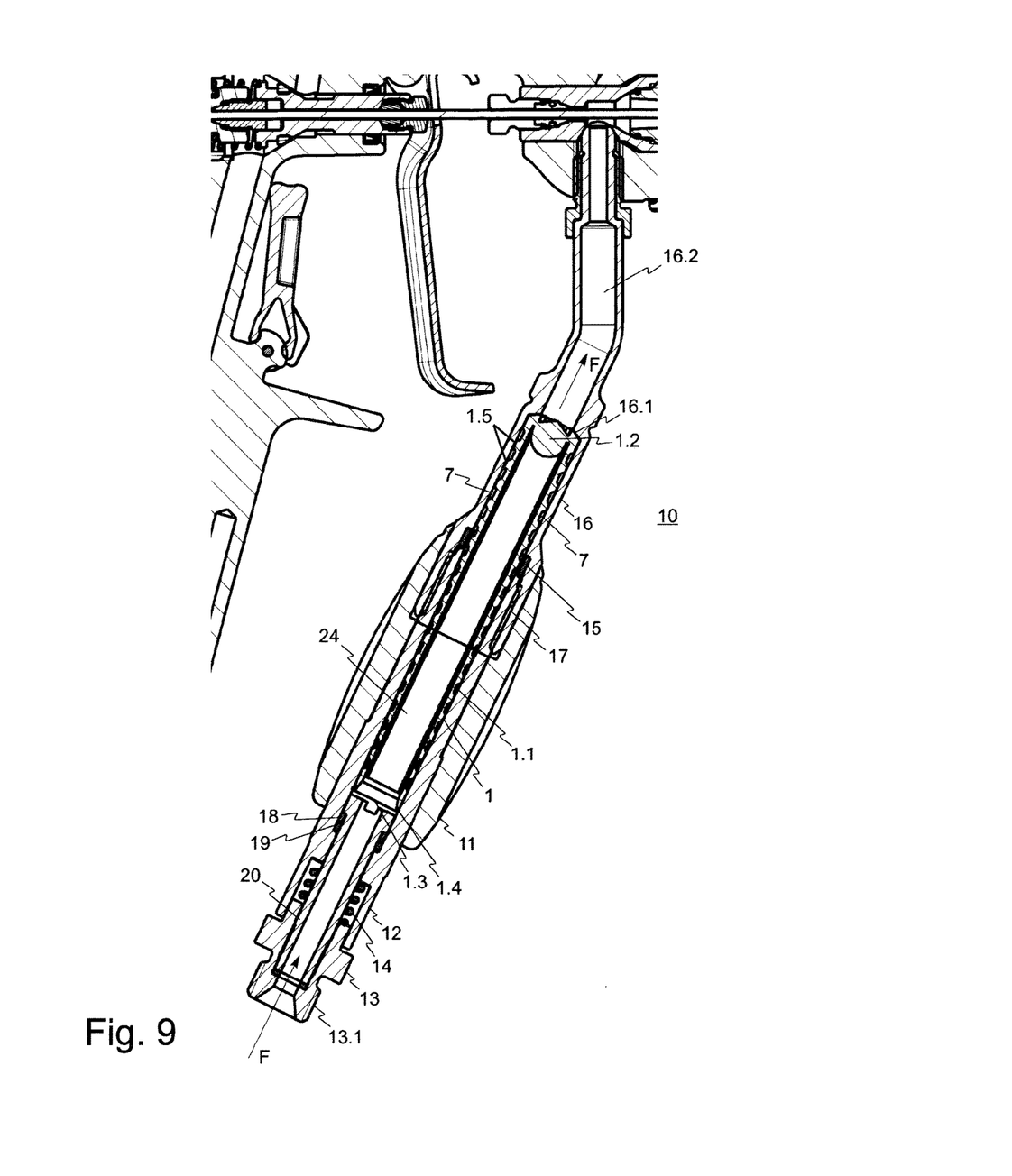
FIG. 9 shows a sectional view of the first embodiment of the spray gun filter according to the invention as installed in a spray gun.

FIG. 9 shows a sectional view of the first embodiment of the spray gun filter according to the invention as installed in a spray gun 10. The filter housing for the spray gun filter comprises an upstream housing part 12 and a downstream housing part 16. Both housing parts 12 and 16 are interconnected via a releasable connection 17, for example a screw connection. The two housing parts 12 and 16 are surrounded in part by a grip piece 11, which facilitates the connection and separation of the housing parts 12 and 16. A seal 15 ensures that no liquid F can escape at the connection point 17.

The upstream housing part 12 is connected to a hinge joint 13, which carries a coupling 13.1 at the upstream end for the connection of a supply line. A sleeve 20 is arranged within the hinge joint 13 and protrudes into the interior of the upstream housing part 12. Two ring seals 18 and 19 are provided to seal the hinge joint 13. The sleeve 20 is pressed permanently against the two ring seals 18 and 19 via a compression spring 14.

The upstream housing part 6 has a shoulder 16.1 in the interior, said shoulder being used as a stop for the spray gun filter. On the output side the downstream housing part 16 discharges into the part of the spray gun 10 containing the valve needle for the spray nozzle.

Instead of the first embodiment of the spray gun filter, the filter housing 12, 16 of the spray gun 10 may also receive one of the other described embodiments of the spray gun filter.

Figures 10, 11:
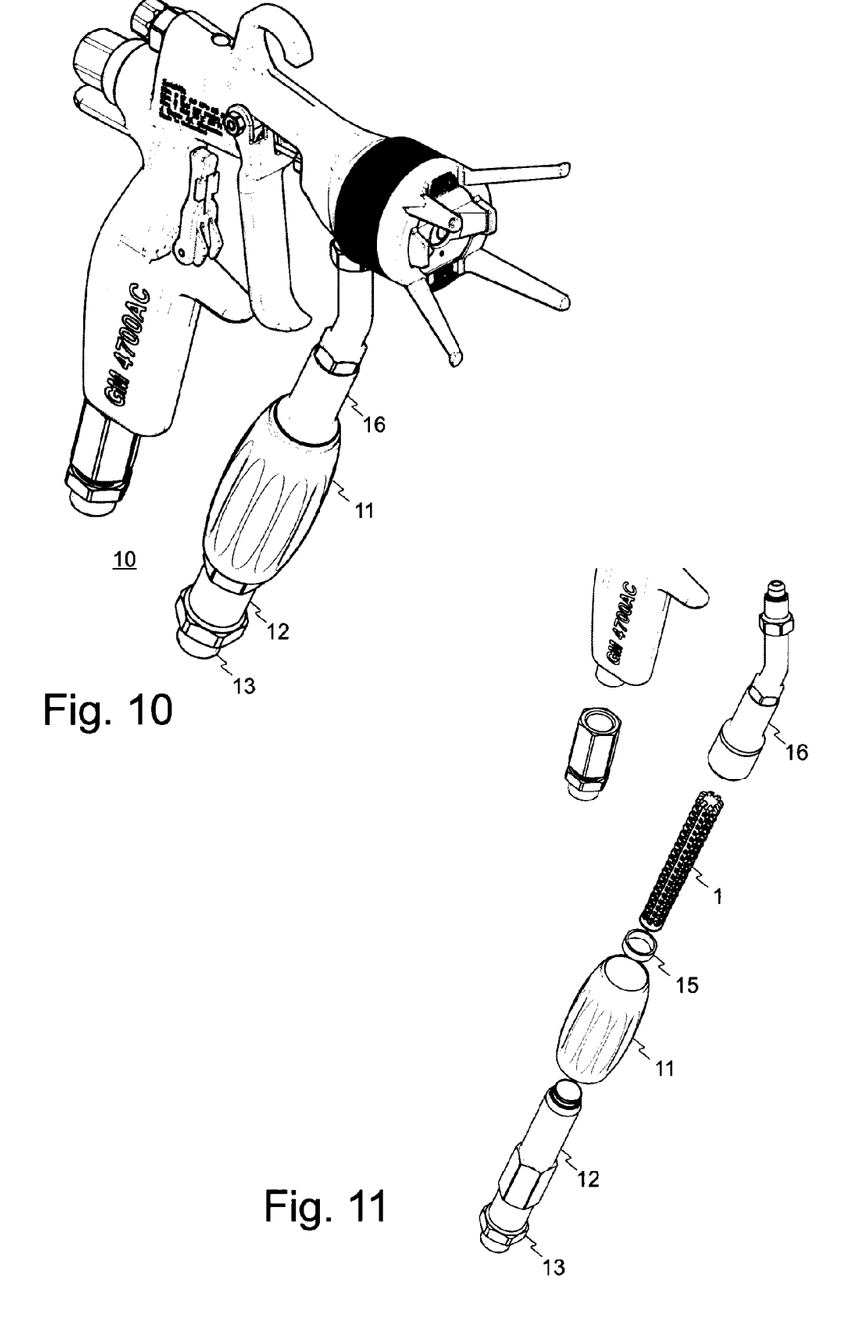
FIG. 10 shows a three-dimensional view of a spray gun with a spray gun filter according to the invention.
FIG. 11 shows an exploded view of the spray gun with the spray gun filter according to the inven-tion.

FIG. 10 shows a three-dimensional view of the spray gun 10 with a spray gun filter according to the invention.

FIG. 11 shows an exploded view of part of the spray gun 10 with the spray gun filter according to the invention.

Figure 12:
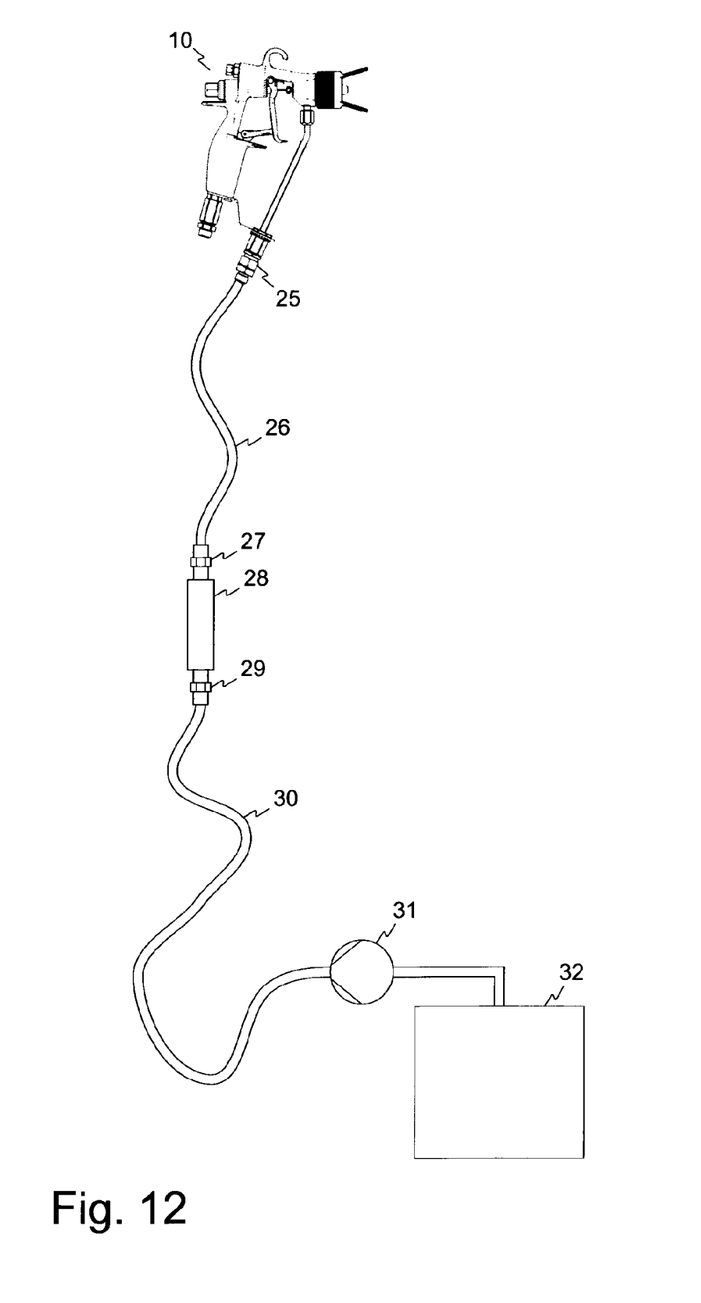
FIG. 12 shows part of a coating system, with which the spray gun filter according to the invention is installed in the tube line, which leads to the spray gun.

FIG. 12 shows part of a coating system, with which the spray gun filter according to the invention is installed in a tube line 26, 30, via which the spray gun 10 is supplied with coating material. The spray gun filter according to the invention is located in a filter housing 28, which has a coupling 29 on the inlet side for a further material tube 30 and has a further coupling 27 on the outlet side for a second material tube 26. The coating material to be filtered is pumped out from a storage container 32 using a feed pump 31 and is fed to the spray gun filter according to the invention via the first material tube 30. The material filtered through the spray gun filter is transported to the spray gun 10 via the second material tube 26. The second material tube 26 is likewise equipped with a coupling 25 in order to connect it to the spray gun 10.

The spray gun filter according to the invention therefore does not have to be a component of the spray gun 10, but also can be arranged in the tube line 26, 30.

The embodiment shown in FIG. 12 has the advantage that the spray gun 10 is even lighter. The user does not have to lift either the housing for the spray gun filter or the spray gun filter itself or the coating material located in the spray gun filter. The coating process is more comfortable and less tiring.

The above description of the exemplary embodiments ac-cording to the present invention is used merely for illustrative purposes and not for the purpose of limiting the invention. Various changes and modifications are possible within the scope of the invention without departing from the scope of the invention and equivalents thereto. For example, the embodiments of the spray gun filter shown in FIGS. 6 to 8 can thus also be used for the spray gun 10. The individual features of the embodiments of the spray gun filter shown in FIGS. 3 to 8 can also be combined with one another in a manner different from that shown in the figures. For example, the second, third and fourth embodiment may thus have, externally, a cylindrical portion 8 and a conical portion 9.

LIST OF REFERENCE SIGNS 1 filter support
1.1 outlet openings
1.2 filter head
1.3 inlet
1.4 lip seal
1.5 supporting element
2 filter fabric
2.1 inner face
2.2 outer face
3 weld seam
4 weld seam
5 sleeve
5.4 lip seal
6 channel
7 channel
8 cylindrical portion
9 conical portion
10 spray gun
11 grip
12 upstream part of the filter housing
13 hinge joint
13.1 coupling
14 spring
15 seal
16 downstream part of the filter housing
16.1 shoulder
16.2 material channel
17 releasable connection
18 seal
19 seal
20 connecting sleeve
22 sleeve
22.2 filter head
22.3 inlet
22.4 lip seal
22.5 lip seal
22.6 outlet opening
23 sleeve
23.2 filter head
23.3 inlet
23.4 lip seal
23.5 lip seal
23.6 outlet opening
23.7 longitudinal groove in the sleeve
24 interior of the spray gun filter
25 coupling
26 material tube
27 coupling
28 filter housing with spray gun filter
29 coupling
30 material tube
31 feed pump
32 storage container with coating material
F direction of flow of the liquid
D2 diameter at the filter head
D3 diameter at the inlet
100 spray gun filter
101 filter support
102 filter fabric
103 channel
104 outlet openings
105 interior
106 upstream interior
110 spray gun
111 spring
112 filter housing
116 filter housing

The invention claimed is:

1. A spray gun filter for filtering liquid, wherein the spray gun filter comprises:
a filter fabric, and
a filter support,
wherein the filter fabric has a cylindrical tubular shape,
wherein the filter support comprises outlet openings for the liquid, an interior surface, an exterior surface, a first end, and a second end,
wherein the interior surface of the filter support surrounds the filter fabric from the outside and forms a cylindrical volume configured to receive the filter fabric,
wherein the exterior surface of the filter support which surrounds the cylindrical volume is conical,
wherein the first end of the filter support is open and forms an inlet for liquid and the second end of the filter support is closed,
wherein the first end of the filter support has an outer diameter that is smaller than an outer diameter of the second end of the filter support, and
wherein the exterior surface of the filter support includes a plurality of radial protruding supporting elements that bear against a filter housing of a spray gun when the filter support is inserted into the filter housing.

2. The spray gun filter according to claim 1, wherein the outlet openings are distributed over the length of the filter support.

3. The spray gun filter according to claim 1, wherein the outlet openings are arranged in the second end of the filter support.

4. The spray gun filter according to claim 1, wherein the filter support has the inlet at an upstream end and is closed at a downstream end.

5. The spray gun filter according to claim 1, wherein the filter fabric is produced from wire.

6. The spray gun filter according to claim 1, wherein the filter support is produced from polyamide, polypropylene, polyethylene or polyoxymethylene.

7. The spray gun filter according to claim 1, wherein the filter support has a seal in the first end.

8. The spray gun filter according to claim 1, wherein a sleeve is provided, in which the filter support is fitted, and
wherein the filter support and the sleeve are formed in such a way that they form a channel for the liquid.

9. The spray gun configured to receive the spray gun filter according to claim 1, wherein the filter housing for receiving the spray gun filter is provided, and wherein the exterior surface of the filter support bears against the filter housing.

10. The spray gun according to claim 9, wherein the filter support and the filter housing are formed in such a way that they together form a channel for the liquid.

11. The spray gun according to claim 9, wherein the filter support and the filter housing are formed in such a way that they together form a plurality of channels, which are interconnected.

12. The spray gun according to claim 9, wherein the filter housing comprises a first and a second housing part, which are interconnected by means of a releasable connection.

13. The spray gun according to claim 9, wherein the filter housing has a shoulder, on which the filter support is supported.

14. A spraying system comprising the spray gun, a tube line, and the spray gun filter according to claim 1, wherein the spray gun filter is arranged between two tube portions of the tube line.

15. A method of using the spray gun filter according to claim 1, wherein the method comprises a step of using the spray gun filter to filter water-soluble paint, solvent-containing paint, multi-component paint, a dispersion, a primer, oil or anti-corrosion agents.

16. The spray gun filter according to claim 1, wherein the radial protruding supporting elements are distributed over the entire length of the filter support.

* * * * *